US012718152B2

(12) United States Patent
Das et al.

(10) Patent No.: US 12,718,152 B2
(45) Date of Patent: Aug. 25, 2026

(54) APPARATUS WITH IN-MEMORY PROCESSING USING SYSTOLIC ARRAYS AND COMPUTING APPARATUS INCLUDING THE SAME

(71) Applicant: Samsung Electronics Co., Ltd., Suwon-si (KR)

(72) Inventors: Saptarsi Das, Bangalore (IN); Sabitha Kusuma, Aachen (DE); Arnab Roy, Bangalore (IN); Ankur Deshwal, Bangalore (IN); Kiran Kolar Chandrasekharan, Bangalore (IN); Sehwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1020 days.

(21) Appl. No.: 17/147,858

(22) Filed: Jan. 13, 2021

(65) Prior Publication Data

US 2022/0036243 A1 Feb. 3, 2022

(30) Foreign Application Priority Data

Jul. 29, 2020 (IN) ............................ 201941031403
Oct. 6, 2020 (KR) ........................ 10-2020-0128899

(51) Int. Cl.
*G06N 20/10* (2019.01)
*G06F 9/30* (2018.01)
(Continued)

(52) U.S. Cl.
CPC ......... *G06N 20/10* (2019.01); *G06F 9/30036* (2013.01); *G06F 9/3887* (2013.01); *G06F 15/8046* (2013.01); *G06F 17/16* (2013.01)

(58) Field of Classification Search
CPC ........ G06N 20/10; G06N 3/048; G06N 3/045; G06N 3/0455; G06F 9/30036;
(Continued)

(56) References Cited

U.S. PATENT DOCUMENTS 8,924,455 B1 * 12/2014 Barman ................ G06F 7/5443 708/607
9,721,203 B1 8/2017 Young et al.
(Continued)

OTHER PUBLICATIONS

Jeff (Jun) Zhang et al., "CompAct: On-chip Compression of Activations for Low Power Systolic Array Based CNN Acceleration," ACM Trans. Embed. Comput. Syst. 18, 5s, Article 47 (Oct. 2019), 24 page (Year: 2019).*
(Continued)

*Primary Examiner* — David Yi
*Assistant Examiner* — Nicholas Shine
(74) *Attorney, Agent, or Firm* — NSIP Law

(57) ABSTRACT

An apparatus includes a global memory and a systolic array. The global memory is configured to store and provide an input feature map (IFM) vector stream from an IFM tensor and a kernel vector stream from a kernel tensor. The systolic array is configured to receive the IFM vector stream and the kernel vector stream from the global memory. The systolic array is on-chip together with the global memory. The systolic array includes a plurality of processing elements (PEs) each having a plurality of vector units, each of the plurality of vector units being configured to perform a dot-product operation on at least one IFM vector of the IFM vector stream and at least one kernel vector of the kernel vector stream per unit clock cycle to generate a plurality of output feature maps (OFMs).

20 Claims, 17 Drawing Sheets

(51) Int. Cl.
*G06F 9/38* (2018.01)
*G06F 15/80* (2006.01)
*G06F 17/16* (2006.01)

(58) Field of Classification Search
CPC .... G06F 15/8046; G06F 17/16; G06F 9/3001; G06F 9/3887; G06F 9/30038; G06F 7/50; G06F 7/52; G06F 7/57; G06F 8/4441; G06F 8/4452; G06F 8/452
See application file for complete search history.

(56) References Cited

U.S. PATENT DOCUMENTS

| | | | | |
|---|---|---|---|---|
| 2011/0219207 | A1* | 9/2011 | Suh | G06F 9/22 712/E9.004 |
| 2016/0267111 | A1* | 9/2016 | Shoaib | G06T 1/20 |
| 2018/0074996 | A1* | 3/2018 | Ling | G06F 17/16 |
| 2018/0314671 | A1 | 11/2018 | Zhang et al. | |
| 2019/0087716 | A1 | 3/2019 | Du et al. | |
| 2019/0236049 | A1 | 8/2019 | Vantrease et al. | |
| 2019/0311243 | A1* | 10/2019 | Whatmough | G06N 3/063 |
| 2021/0349694 | A1* | 11/2021 | Ulrich | G06F 7/483 |

OTHER PUBLICATIONS

Umuroglu, Y., et al., "FINN: A Framework for Fast, Scalable Binarized Neural Network Inference," in Proceedings of the 2017 ACM/SIGDA International Symposium on Field-Programmable Gate Arrays, 2017, pp. 65-74, https://arxiv.org/abs/1612.07119, (Year: 2016).*

A. Shafiee et al., "ISAAC: A Convolutional Neural Network Accelerator with In-Situ Analog Arithmetic in Crossbars," 2016 ACM/IEEE 43rd Annual International Symposium on Computer Architecture (ISCA), Seoul, Korea (South), 2016, pp. 14-26, doi: 10.1109/ISCA.2016.12, (Year: 2016).*

Wei, Xuechao, et al. "Automated Systolic Array Architecture Synthesis for High Throughput CNN Inference on FPGAs." Proceedings of the 54th Annual Design Automation Conference 2017. 2017. (6 pages in English).

Yang, Zhijie, et al. "Systolic Array Based Accelerator and Algorithm Mapping for Deep Learning Algorithms." 15th IFIP International Conference on Network and Parallel Computing (NPC), Nov. 2018, Muroran, Japan. pp. 153-158, 10.1007/978-3-030-05677-3_16. Hal-02279547, (6 pages in English).

Sombatsiri, Salita, et al. "Parallelism-Flexible Convolution Core for Sparse Convolutional Neural Networks." SASIMI2018, 2018, (6 pages in English).

Korean Office Action issued on Dec. 23, 2024 in corresponding Korean Patent Application No. 10-2020-0128899. (5pages in English, 6pages in Korean).

Song, Jinook, et al. "7.1 An 11.5 TOPS/W 1024-MAC Butterfly Structure Dual-Core Sparsity-Aware Neural Processing Unit In 8nm Flagship Mobile SoC." 2019 IEEE International Solid-State Circuits Conference—(ISSCC). IEEE, Feb. 19, 2019. (pp. 130-132).

* cited by examiner

APPARATUS WITH IN-MEMORY PROCESSING USING SYSTOLIC ARRAYS AND COMPUTING APPARATUS INCLUDING THE SAME

CROSS-REFERENCE TO RELATED APPLICATIONS

This application claims the benefit under 35 USC 119(a) of Indian Patent Application No. 201941031403, filed on Jul. 29, 2020, in the Indian Patent Office and Korean Patent Application No. 10-2020-0128899, filed on Oct. 6, 2020, in the Korean Intellectual Property Office, the entire disclosures of which are incorporated herein by reference for all purposes.

BACKGROUND

1. Field

The present description relates to an apparatus with accelerated machine learning processing.

2. Description of Related Art

In the domain of deep learning, computer vision and speech processing are two very desirable areas. Convolution neural networks (CNNs) and long short term memory (LSTM) are desirable components of computer vision and speech processing, respectively. Power-efficient execution of a CNN and LSTM models is desirable especially in mobile phones and other handheld devices. Many mobile phones are equipped with accelerators for the CNN models and in the CNN models, for example, the most compute-intensive parts are convolution (CONV) operations. CNN's applications constitute a multitude of CONV operations. CONV operations are computationally dominant and so should be carried out power-efficiently to ensure that the overall power efficiency of the CNN applications is high. Further, GEMM and GEMV operations of LSTM are computationally dominant. Thus, they should be executed in a power efficient manner to ensure overall high power efficiency of LSTM applications.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus includes a global memory and a systolic array. The global memory is configured to store and provide an input feature map (IFM) vector stream from an IFM tensor and a kernel vector stream from a kernel tensor. The systolic array is configured to receive the IFM vector stream and the kernel vector stream from the global memory. The systolic array is on-chip together with the global memory. The systolic array includes a plurality of processing elements (PEs) each having a plurality of vector units, each of the plurality of vector units being configured to perform a dot-product operation on at least one IFM vector of the IFM vector stream and at least one kernel vector of the kernel vector stream per unit clock cycle to generate a plurality of output feature maps (OFMs).

The global memory may be connected to an IFM fetcher unit, and the IFM fetcher unit may be configured to fetch IFM vectors from the global memory and form the IFM vector stream fed to the systolic array.

The IFM fetcher unit may include buffers respectively dedicated to IFM vector streams, and the buffers may be configured to store the IFM vector streams fed to the systolic array.

The global memory may be connected to a kernel fetcher unit, and the kernel fetcher unit may be configured to fetch kernel vectors from the global memory and form the kernel vector stream fed to the systolic array.

A number of kernel vectors fetched by the kernel fetcher unit may be equal to a number of vector units available in each of the PEs.

The kernel fetcher unit may include buffers respectively dedicated to kernel vector streams, and the buffers may be configured to store the kernel vector streams fed to the systolic array.

The IFM vector stream and the kernel vector stream may be input to the systolic array, based on identification of an IFM window and a kernel tensor, and streaming of pixels of the IFM window and the kernel tensor, such that relative positions of IFM vectors and kernel vectors input to at least one of the plurality of PEs match.

The apparatus may further include an OFM write-back unit configured to collect OFM pixels generated from the systolic array and writing the OFM pixels to the global memory.

The plurality of PEs may be arranged in an m×n matrix form, wherein m denotes the number of rows, n denotes the number of columns, and m and n are equal.

At least one PE from the plurality of PEs in each row may receive IFM vectors and transfer the IFM vectors to PEs next to the at least one PE in the same row as the at least one PE, and PEs in a same row of the systolic array may share the same IFM vector stream.

At least one PE from the plurality of PEs in each column may receive kernel vectors and transfer the kernel vectors to PEs below the at least one PE in a direction in which kernel vectors are transferred in the same column as the at least one PE, and PEs in a same column of the systolic array may share the same kernel vector stream.

The plurality of vector units may be configured to perform the dot-product operations in parallel based on lengths of respective dot-products.

Each of the plurality of vector units may include a collection of multiplier hardware and an adder tree for generating OFM pixels.

The global memory may include a plurality of memory banks, and each of the plurality of memory banks may be assigned to a tensor of a predetermined type at the beginning of a systolic operation.

The apparatus may be configured to accelerate machine learning operations.

The apparatus may be a smartphone, a laptop, a desktop, a smart watch, or a smart TV.

In another general aspect, an apparatus includes a global memory and a convolution operation data path engine. The global memory is configured to store input feature map (IFM) data, weights, kernel data, and output feature map (OFM) data. The convolution operation data path engine, connected to the global memory, includes an IFM fetcher unit, a kernel fetcher unit, a systolic array, and an OFM write-back unit. The IFM fetcher unit, connected to the global memory, is configured to fetch the IFM data from the global memory and form an IFM vector stream. The kernel fetcher unit, connected to the global memory, is configured to fetch kernel data from the global memory and form a kernel vector stream. The systolic array, configured to receive the IFM vector stream and the kernel vector stream, includes a plurality of processing elements (PEs) each having a plurality of vector units, each of the plurality of vector units being configured to perform a dot-product operation on an IFM vector of the IFM vector stream and a kernel vector of the kernel vector stream per unit clock cycle to generate output feature maps (OFMs). The OFM write-back unit is configured to collect and write the OFMs to the global memory.

The kernel fetcher unit may be further configured to fetch kernel vectors from the global memory and form the kernel vector stream.

A number of the kernel vectors may be equal to a number of vector units available in each of the PEs.

The kernel fetcher unit may include buffers respectively dedicated to kernel vector streams, and the buffers may be configured to store the kernel vector streams fed to the systolic array.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
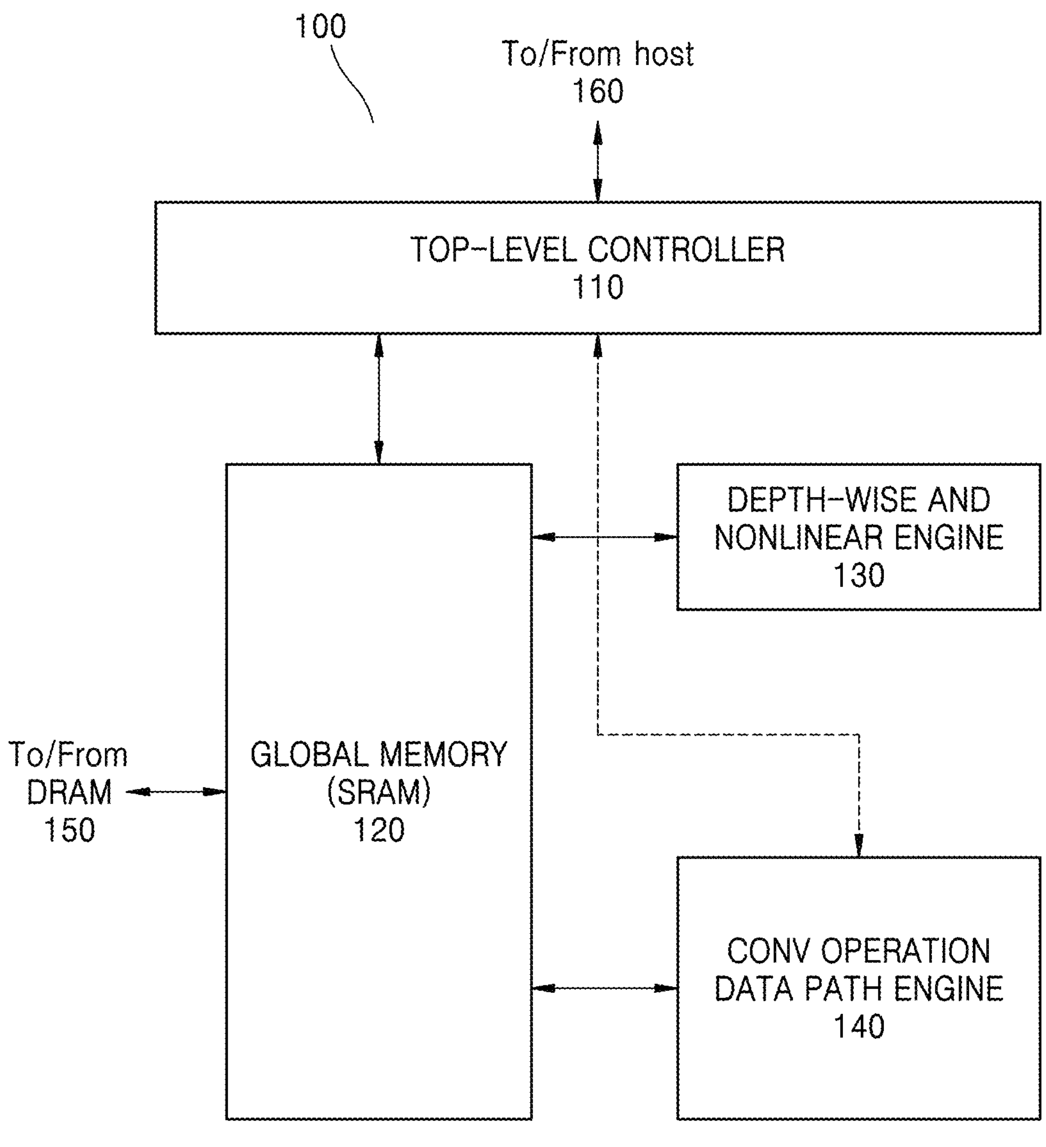
FIG. 1 is a block diagram showing an apparatus for accelerating machine learning operations, according to one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present embodiment provides an apparatus for accelerating machine learning operations with high energy efficiency and low area. Hereinafter, embodiments of the present disclosure will be described in detail with reference to the accompanying drawings. Similar reference numerals indicate corresponding features throughout the drawings, and example embodiments are shown.

Systolic arrays may be desirable for exploiting the massive parallelism present in convolution kernels while maximizing data reuse to reduce the cost of memory accesses. They have the potential to reach very high power/area efficiency when compared to their single instruction, multiple data (SIMD) counterparts.

The systolic arrays used for accelerating CNNs and LSTMs typically use scalar processing elements (PEs), where each PE consumes a pair of an input feature map (IFM) and a kernel pixel in every clock cycle and produces an update for one output feature map (OFM). This approach increases the energy as well as area cost of accumulation.

Therefore, there is a desire for a technology capable of increasing energy efficiency and reducing storage area cost in machine learning.

FIG. 1 is a block diagram showing an apparatus for accelerating machine learning operations (hereinafter, referred to as an apparatus), according to one or more embodiments.

An apparatus 100 may be, but not limited to, a smartphone, a laptop, a desktop, a smart watch, or a smart TV.

The apparatus 100 may include a top-level controller 110, a global memory 120, a depth-wise and nonlinear engine 130, and a convolution (CONV) operation data path engine 140. The use of the term "may" herein with respect to an example or embodiment (e.g., as to what an example or embodiment may include or implement) means that at least one example or embodiment exists where such a feature is included or implemented, while all examples are not limited thereto.

In one or more embodiments, the top-level controller 110 may be configured not only to transfer tensor data between off-chip dynamic random access memory (DRAM) 150 and the on-chip global memory 120, but also to trigger computations in the CONV operation data path engine 140 and the depth-wise and nonlinear engine 130.

The global memory 120 may be a volatile memory that may be used to store inputs, input feature map (IFM) data related to the inputs, output feature map (OFM) data, etc., and may refer to static random access memory (SRAM). In the present embodiment, the global memory 120 is described as SRAM. However, one of ordinary skill in the art may easily understand that the global memory 120 may also be synchronous dynamic random access memory (SDRAM), for example.

In one or more embodiments, the global memory 120 may act as a scratch-pad memory for local storage of various multi-dimensional tensors. The CONV operation data path engine 140 and the depth-wise and nonlinear engine 130 may fetch input tensors from the global memory 120 and perform their respective operations.

In one or more embodiments, the depth-wise and nonlinear engine 130 may be configured to perform depth-wise convolution (DWCONV) operations and pooling operations and may perform various types of point-wise non-linear functions, such as variants of ReLU, hyperbolic tangent (Tanh), and sigmoid.

In one or more embodiments, the CONV operation data path engine 140 may be configured to perform convolution (CONV) operations, dilated convolution (Di-CONV) operations, general matrix-matrix multiplication (GEMM) operations, and general matrix-vector multiplication (GEMV) operations on sets of multi-dimensional tensors.

Although the FIG. 1 shows various hardware components of the apparatus 100, they are merely examples, and hardware components of the apparatus 100 are not limited thereto. In other embodiments, the apparatus 100 may include a smaller or greater number of components. Further, the labels or names of the components are used only for illustrative purpose and do not limit the scope of the disclosure. One or more components may be combined together to perform the same or substantially similar function for accelerating machine learning operations.

Figure 2:
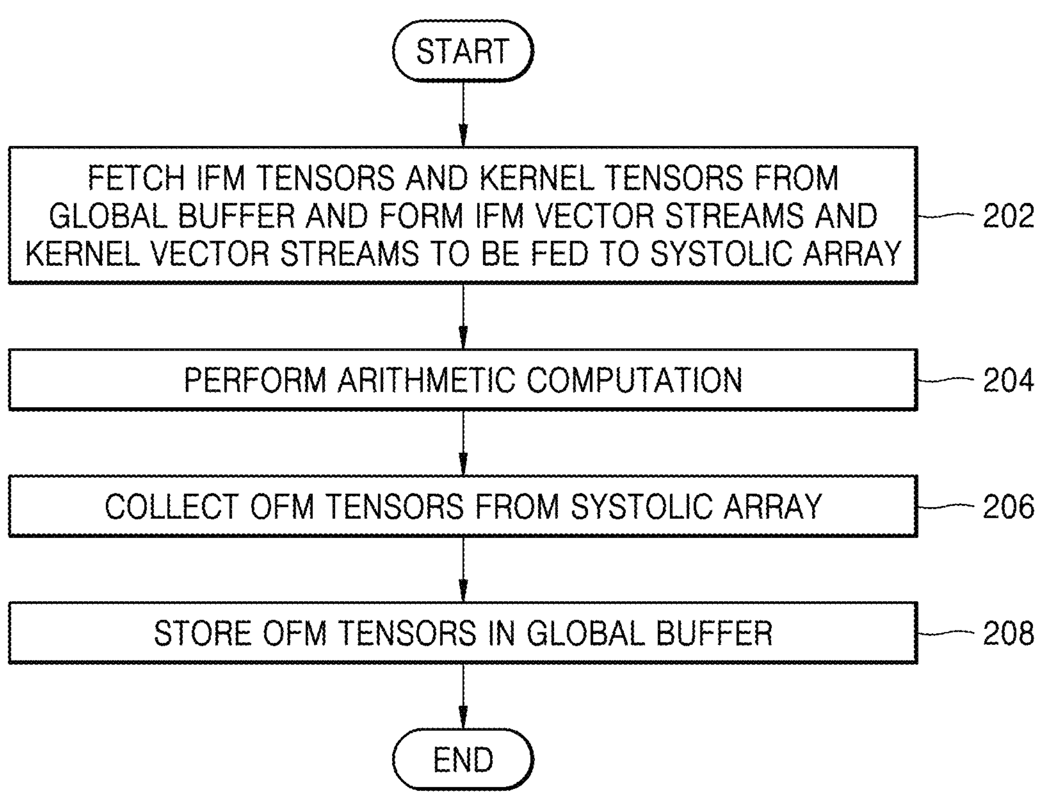
FIG. 2 is a flowchart of a method of accelerating machine learning operations, according to one or more embodiments.

FIG. 2 is a flowchart of a method of accelerating machine learning operations, according to one or more embodiments.

Referring to FIG. 2, operations 202, 204, 206, and 208 may be performed by an apparatus that accelerates machine learning operations (e.g., the apparatus 100 of FIG. 1).

In operation 202, the apparatus may fetch IFM tensors and kernel tensors from a global buffer (e.g., the global memory 120 of FIG. 1) and form IFM vector streams and kernel vector streams to be fed to a systolic array. The IFM vector stream may refer to a continuous column or list of IFM vectors, and the kernel vector stream may refer to a continuous column or list of kernel vectors. The systolic array may refer to a special processor designed such that cells having the same function form a network and perform one operation according to an overall synchronization signal.

In operation 204, the apparatus may perform an arithmetic computation. The arithmetic computation may refer to a convolution operation or a GEMM operation, but is not limited thereto.

In operation 206, the apparatus may collect OFM tensors from the systolic array.

In operation 208, the apparatus may store OFM tensors in the global buffer. Hereinafter, the operations of FIG. 2 will be described in more detail with reference to FIGS. 3 to 16.

Figure 3:
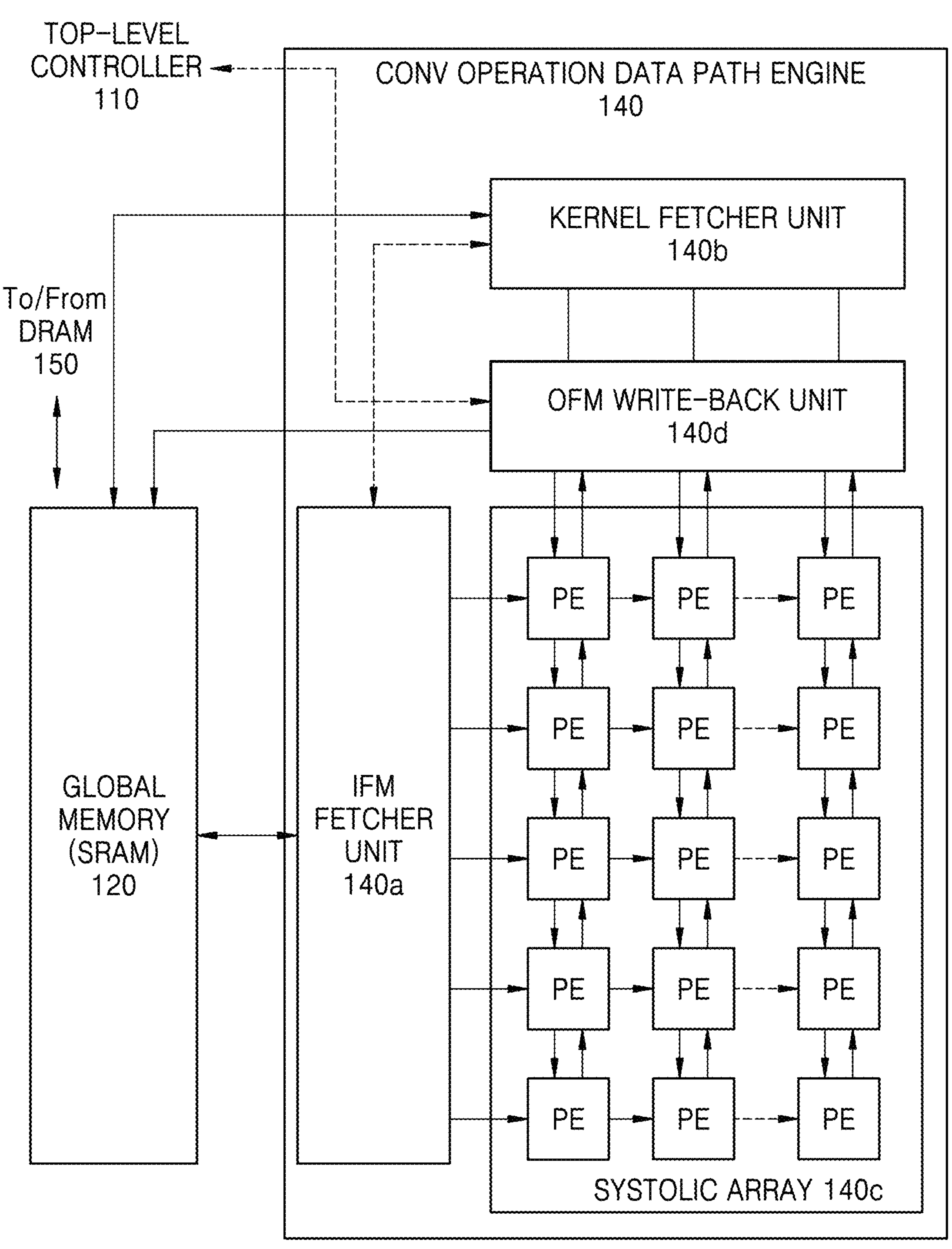
FIG. 3 is a block diagram showing data-paths of operations according to one or more embodiments.

FIG. 3 is a block diagram showing data-paths of operations according to one or more embodiments.

Referring to FIG. 3, an apparatus for accelerating machine learning operations (e.g., the apparatus 100 for accelerating machine learning operations in FIG. 1) may include the global memory 120, the CONV computation data path engine 140, an IFM fetcher unit 140*a*, a kernel fetcher unit 140*b*, and an OFM write-back unit 140*d*. FIG. 3 may show implementation of data-paths for CONV operations, GEMM operations, and GEMV operations proposed together with the global memory 120. As used herein, the IFM fetcher unit

140*a*, the kernel fetcher unit 140*b*, and the OFM write-back unit 140*d* refer to hardware devices or hardware device components.

In one or more embodiments, the CONV operation data path engine 140 may include the IFM fetcher unit 140*a*, the kernel fetcher unit 140*b*, a systolic array 140*c*, and the OFM write-back unit 140*d*.

The IFM fetcher unit 140*a* may fetch IFM data from the global memory 120 and form IFM vector streams to be fed to the systolic array 140*c*.

The kernel fetcher unit 140*b* may fetch kernel data from the global memory 120 and form kernel vector streams to be fed to the systolic array 140*c*. Kernel data may refer to weights/filter parameters having predetermined heights and widths. A plurality of kernel channels of kernel data may form a kernel tensor, and the kernel tensor may be, but is not limited thereto, a 3-dimensional (3D) structure or a 3D matrix including a plurality of kernel pixels/values.

The systolic array 140*c* may essentially refer to a collection of PEs where actual arithmetic computations are performed. A plurality of processing elements may be denoted by PEs, and one processing element may be denoted by PE.

The OFM write-back unit 140*d* may collect OFM vector streams from the systolic array 140*c* and write them back to the global memory 120. The OFM vector stream may refer to a continuous column or list of OFM vectors.

In one or more embodiments, the global memory 120 may store IFM data, weights, kernels, and OFM data. The global memory 120 may refer to, but is not limited to, SRAM.

In one or more embodiments of the present disclosure, an apparatus for accelerating machine learning operations may include the global memory 120. The global memory 120 may provide IFM vector streams from IFM tensors and kernel vector streams from kernel tensors fed to the systolic array 140*c* and a systolic array 140*c* on-chip with the global memory. The systolic array 140*c* may include a plurality of PEs, and each of the plurality of PEs may include a plurality of vector units. Each vector unit may generate one OFM pixel at a time by performing a dot-product operation on at least one IFM vector of an IFM vector stream and at least one kernel vector of a kernel vector stream per cycle.

In one or more embodiments, IFM vector streams and kernel vector streams may be input to the systolic array 140*c* by identifying a relevant IFM window and a kernel tensor, and streaming pixels of the IFM window and the kernel tensor, such that relative positions of the IFM vector and the kernel vector input to, at least, one PE from among the plurality of PEs match.

In one or more embodiments, the OFM write-back unit 140*d* may collect generated OFM pixels from the systolic array 140*c* and write the OFM pixels to the global memory 120.

In one or more embodiments, the plurality of PEs may be arranged in an m×n matrix format, wherein m may denote the number of rows and n may denote the number of columns. The number of rows may be equal to the number of columns. Furthermore, in some cases, the number m of rows and the number n of columns may be different from each other.

At least one PE from among a plurality of PEs in each row of the systolic array 140*c* may receive IFM vectors and transfer the IFM vectors to PEs next to the at least one PE within the same row as the at least one PE. Also, PEs in the same row of the systolic array 140*c* may share the same IFM vector stream. The PEs next to the at least one PE may refer to PEs on the right side of the at least one PE in a direction in which IFM vectors are transferred from the IFM fetcher unit 140*a*. For example, in FIG. 3, an arbitrary PE may transfer IFM vectors to PEs located on a side opposite to the IFM fetcher unit 140*a* around the arbitrary PE.

At least one PE from among a plurality of PEs in each column may receive kernel vectors and transfer the kernel vectors to PEs arranged below the at least one PE in a direction in which kernel vectors are transferred in the same column as the at least one PE. The PEs below the at least one PE may refer to PEs located below the at least one PE in the direction in which kernel vectors are transferred from the kernel fetcher unit 140*b*. For example, in FIG. 3, an arbitrary PE may transfer kernel vectors to PEs located on a side opposite to the kernel fetcher unit 140*b* around the arbitrary PE. Also, PEs in the same column of the systolic array 140*c* may share the same kernel vector stream. However, the present disclosure is not limited thereto, and IFM vectors may be transferred in the column-wise direction, and kernel vectors may be transferred in the row-wise direction.

In one or more embodiments, a plurality of vector units in each of the PEs may include dot-product operations in parallel based on a length of each of the dot-products.

Each vector unit may include a collection of multiplier hardware and an adder tree to produce OFM pixels.

In one or more embodiments, the global memory 120 includes a plurality of memory banks, wherein each of the memory banks may be allocated to a predetermined type of tensor at the beginning of a systolic operation. The predetermined type of tensor may refer to, but is not limited to, an IFM tensor or a kernel tensor.

In one or more embodiments, the global memory 120 may be connected to an IFM fetcher unit 140*a*. The IFM fetcher unit 140*a* may fetch IFM vectors from the global memory 120 and from an IFM vector stream to be fed to the systolic array 140*c*. Also, the IFM fetcher unit 140*a* may include buffers respectively dedicated to IFM vector streams. The buffers of the IFM fetcher unit 140*a* may store IFM vector streams to be fed to the systolic array 140*c*.

In one or more embodiments, the global memory 120 may be connected to a kernel fetcher unit 140*b*. The kernel fetcher unit 140*b* may fetch kernel vectors from the global memory 120 and form kernel vector streams to be fed to the systolic array 140*c*. The number of kernel vectors fetched by kernel fetcher unit 140*b* may be equal to the number of vector units available in each of the PEs. The kernel fetcher unit 140*b* may include buffers respectively dedicated to kernel vector streams, wherein the buffers may store kernel vector streams to be fed to the systolic array 140*c*.

Each PEs may include a plurality of vector units, and each vector unit may perform a dot-product operation on an IFM vector and a kernel vector, thereby increasing energy efficiency and reducing an area.

The IFM fetcher unit 140*a*, the kernel fetcher unit 140*b*, the systolic array 140*c*, and the OFM write-back unit 140*d* will be described in detail below with reference to FIGS. 4 to 16.

Meanwhile, for convenience of explanation, only components included in an apparatus for accelerating machine learning operations are illustrated in FIG. 3 as an example, but the present embodiment is not limited thereto. Further, the labels or names of the components are used only for illustrative purpose and do not limit the scope of the disclosure.

Figure 4:
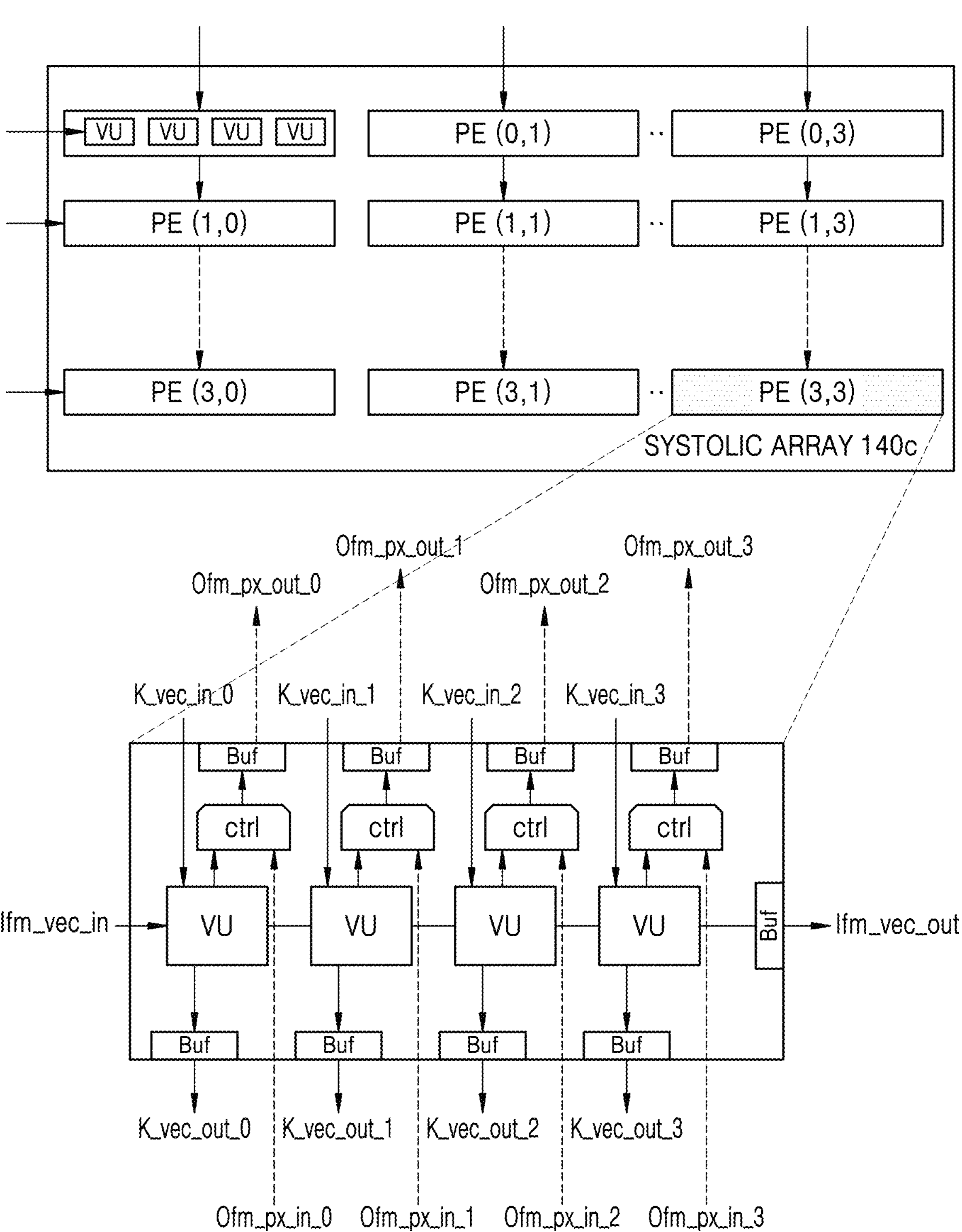
FIG. 4 is a block diagram for describing a systolic array according to one or more embodiments.

FIG. 4 is a block diagram for describing a systolic array according to one or more embodiments.

The systolic array 140*c* may include a plurality of PEs arranged in a 2-dimensional (2D) mesh topology. Each PE may include a collection of vector dot-product units.

FIG. 4 shows an example of a proposed systolic array 140*c* including 4×4 PEs. Each PE may include 4 vector units capable of performing 4 dot-product operations in parallel. The reference numeral VU in FIG. 4 may denote a vector unit. The vector length of each dot-product unit may be 4. Therefore, each vector unit may perform a dot-product operation on 4 IFM pixels and kernel pixels. The proposed structure may be generalized to all dimensions of the systolic array 140*c*, the number of vector units of the PE, and the vector lengths of the vector units.

As shown in FIG. 4, the systolic nature of PEs allows IFM and kernel data to be injected into a PE array through peripheral PEs. Each PE may transfer IFM data to the PEs on the right side in the direction in which the IFM data is transferred and may transfer kernel data to the PEs below in the direction in which kernel data is transferred. IFM data and kernel data may refer to, but are not limited to, IFM vectors and kernel vectors, respectively.

Figure 5:
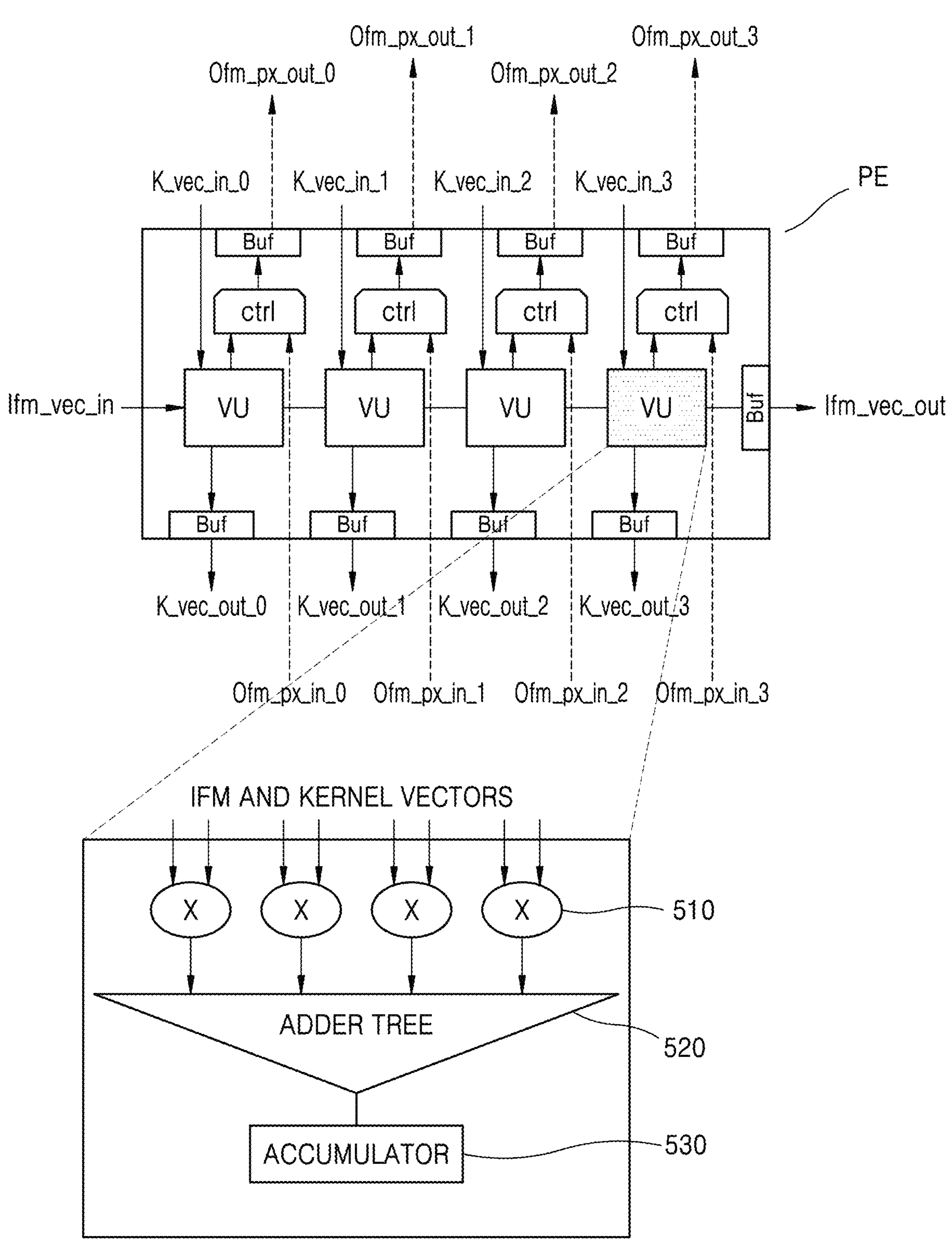
FIG. 5 is a block diagram for describing a PE of a systolic array according to one or more embodiments.

FIG. 5 is a block diagram for describing a PE of a systolic array according to one or more embodiments.

Referring to FIG. 5, a vector unit VU included in a PE may include a collection of multiplier hardware 510 and an adder tree 520. Results of successive dot-product operations may be accumulated in an accumulator register through addition. An accumulator 530 of FIG. 5 may include an accumulator adder and an accumulator register. In the context of a CONV operation, each accumulator 530 may generate one OFM pixel.

In one or more embodiments, IFM vectors and kernel vectors input to a PE may be transferred to PEs next to and below the PE through a forwarding buffer. For example, ifm_vec_in (input IFM vector) and k_vec_in_0 to k_vec_in_3 (input kernel vectors) may be transferred through ifm_vec_out (output IFM vector) and k_vec_out_0 to k_vec_out_3 (output kernel vectors), respectively. The reference numeral Buf in FIG. 5 may denote a buffer.

Figure 6:
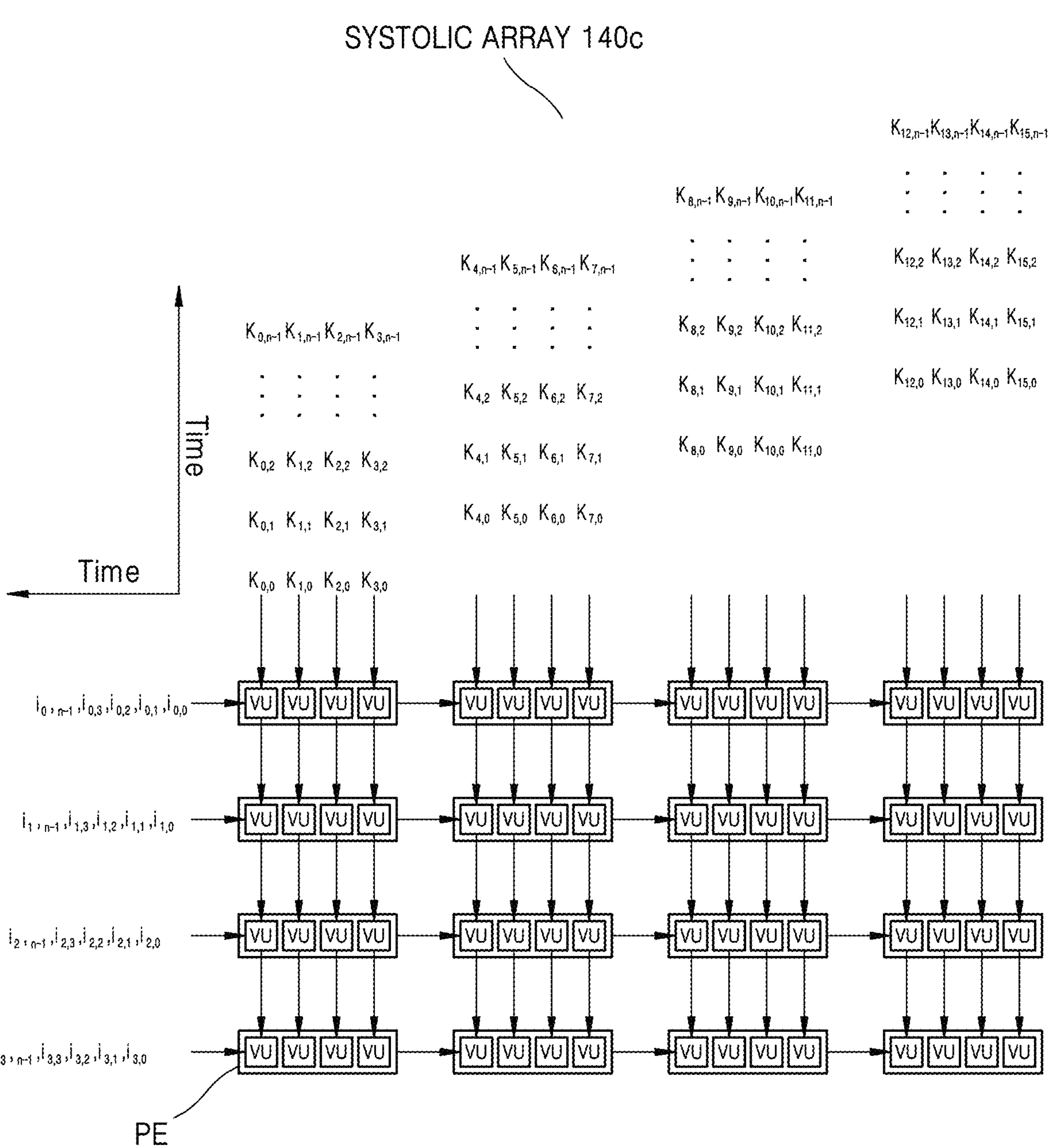
FIG. 6 is a diagram showing an example of an input transfer schedule of a systolic array.

FIG. 6 is a diagram showing an example of an input transfer schedule of a systolic array.

Referring to FIG. 6, an input transfer schedule of the systolic array 140*c* may be performed in a 4×4 systolic array 140*c*.

Each PE of the systolic array 140*c* may perform four vector dot-product operations every cycle. The length of each dot-product may also be 4. Therefore, in the normal state, the systolic array 140*c* may perform 256 multiplications every cycle (i.e., 4×4×4×4=256).

In one or more embodiments, each PE in the systolic array 140c may perform four 4n×4n dot product operations. In this case, because each PE has four dot-product units with a vector length of 4, 4n values of the input vectors may be divided into four sets. Therefore, each PE may simultaneously perform 4 dot-product operations during n cycles. In FIG. 6, $i_{i,j}$ may denote IFM vectors of a length of 4, and $k_{i,j}$ may denote kernel vectors of a length of 4.

Figure 7:
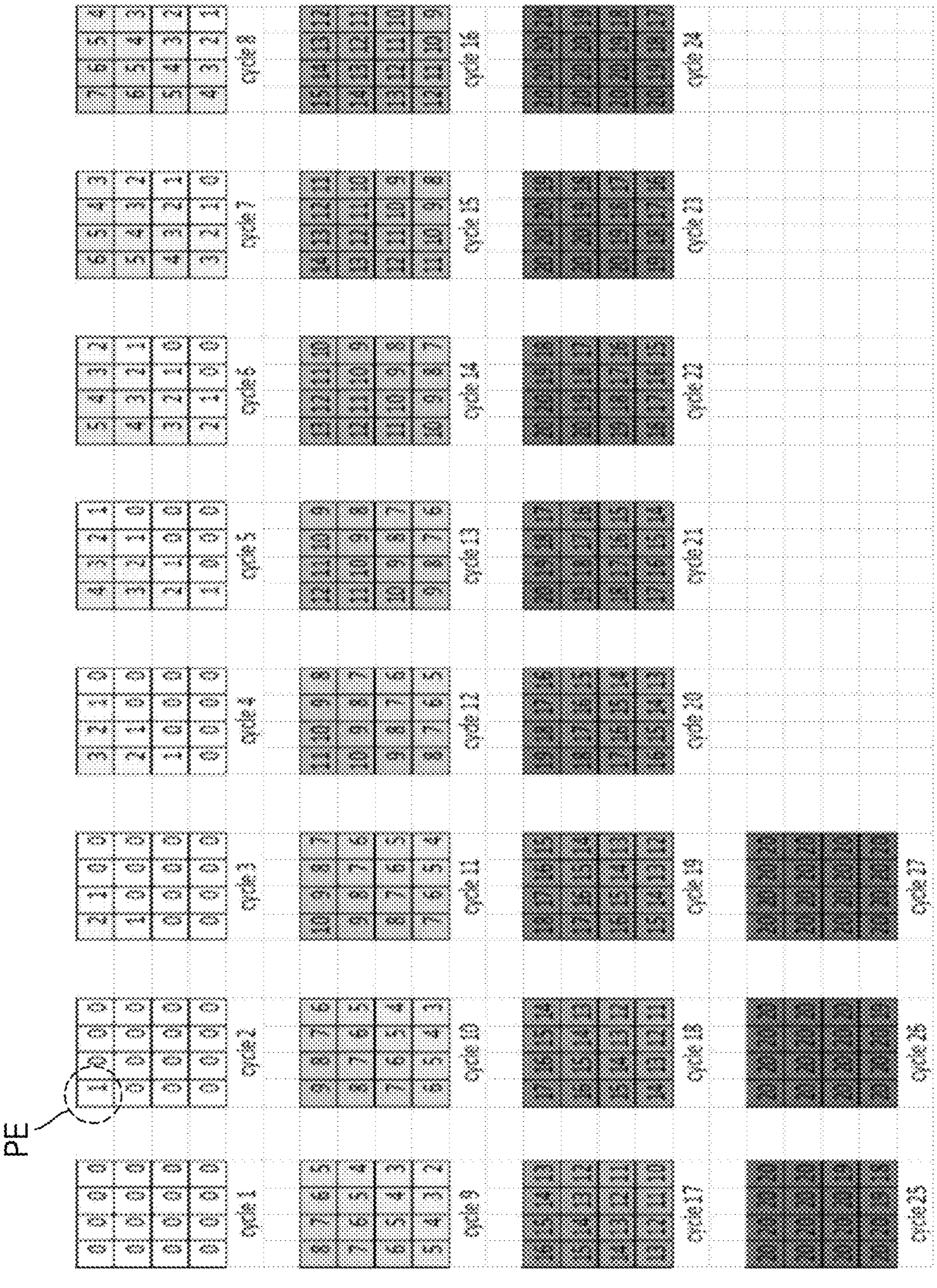
FIG. 7 is a diagram for describing various examples of calculations performed by each PE.

FIG. 7 is a diagram for describing various calculations performed by each PE.

Referring to FIG. 7, various calculations may be performed by each PE in successive clock cycles. FIG. 7 is continued from to FIG. 6, and descriptions already given above are omitted.

In one or more embodiments, to reduce clock cycles wasted due to stalls, an overlapping characteristic of operation and communication of a systolic array may be introduced. Because the overlapping is controlled by software, the need for hazard-detection hardware may be reduced.

The number in each rectangle may indicate the number of calculations performed up to a particular clock cycle. Each rectangle may indicate a PE. Here, each calculation may indicate four dot-product-accumulate operations for a vector of a length of 4.

Initially, every number may be zero. After a first cycle (cycle 1), an input is first fed to the leftmost top PE in a cycle 2, and thus, the leftmost top PE may perform one calculation. In a next cycle, the same inputs may reach PEs next to or below the leftmost top PE. In one or more embodiments, when 4n is 80, n may be 20. Thus, each vector unit may process 20 vector pairs (i.e., 80/4=20). Therefore, the leftmost top PE may complete the calculation after 20 cycles. Also, the rightmost bottom PE may complete a calculation after 26 cycles. In FIG. 7, the direction of the cycle 1 is the leftward direction and the direction of a cycle 3 is the rightward direction, based on the cycle 2.

Figure 8A:
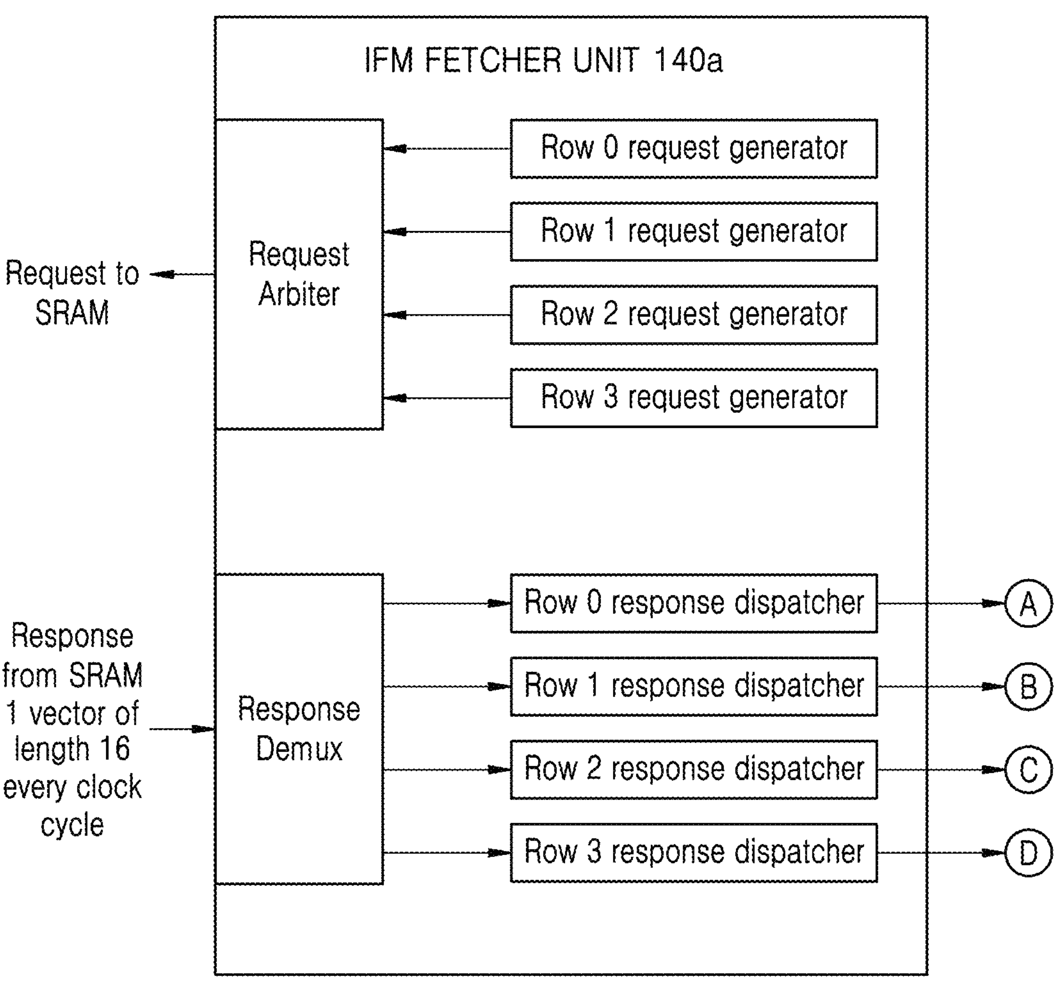
FIGS. 8A and 8B are block diagrams describing an IFM fetcher unit and a kernel fetcher unit according to one or more embodiments.
Figure 8B:
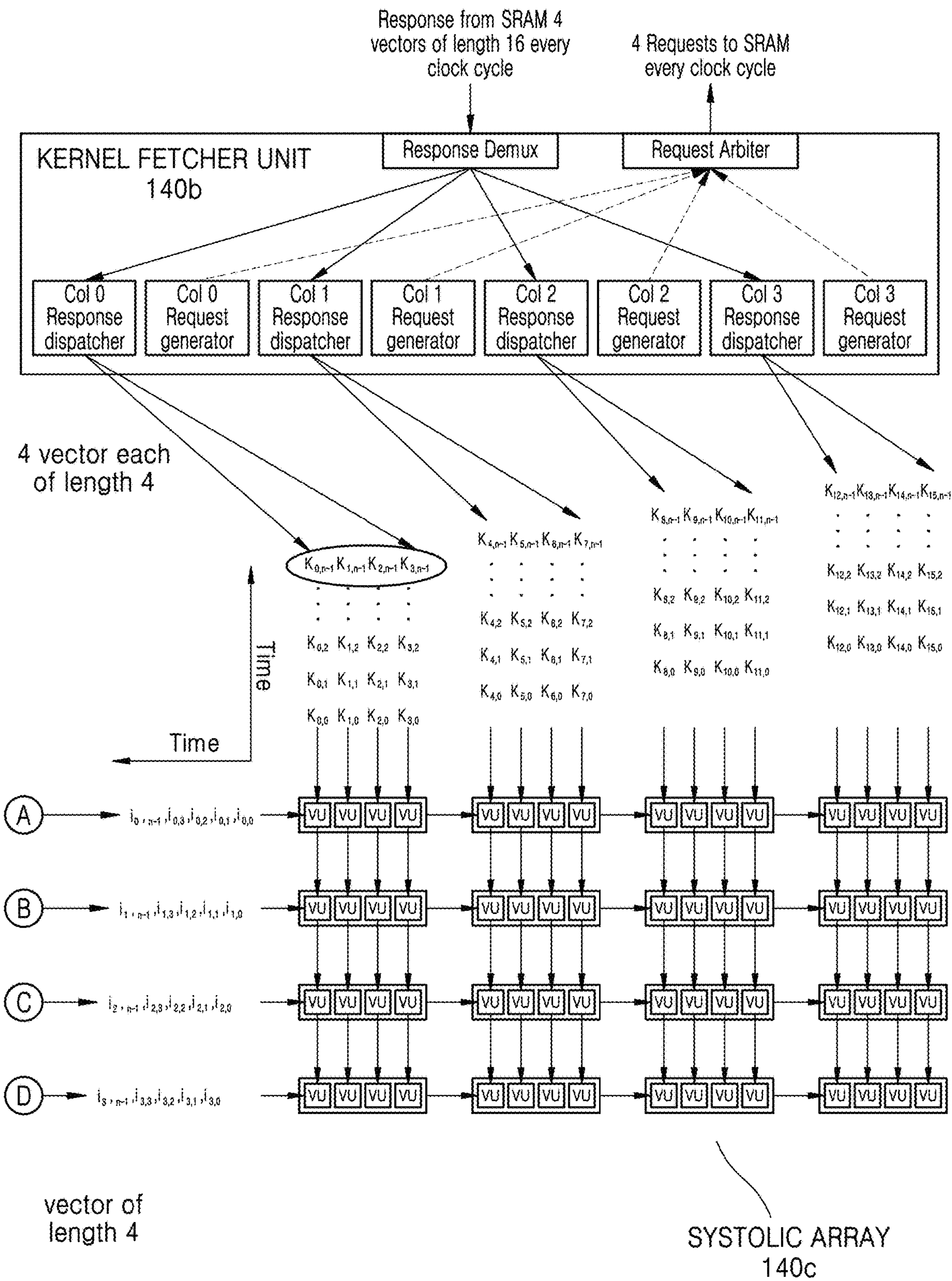

FIGS. 8A and 8B are block diagrams for describing an IFM fetcher unit and a kernel fetcher unit according to one or more embodiments.

Referring to FIGS. 8A and 8B, IFM vectors may be fed to the systolic array 140*c* through rows, and kernel vectors may be fed to the systolic array 140*c* through a column input interface. The IFM fetcher unit 140*a* and the kernel fetcher unit 140*b* may supply data to the 4×4 systolic array 140*c*. Each PE may accommodate four vector units VUs, and each vector unit VU may operate on a vector of a length of 4 (e.g., the systolic array 140*c* of FIG. 4). FIGS. 8A and 8B may be continuous drawings. Circles A, B, C, and D of FIG. 8A may be the same as circles A, B, C, and D of FIG. 8B, respectively.

The IFM fetcher unit 140*a* and the kernel fetcher unit 140*b* may have very similar structures except for some differences in address generating methods. Because the IFM fetcher unit 140*a* and the kernel fetcher unit 140*b* supply data in four rows or columns, there may be four row request generators in the IFM fetcher unit 140*a*, and there may be four column request generators in the kernel fetcher unit 140*b*. Also, the IFM fetcher unit 140*a* and the kernel fetcher unit 140*b* may fetch an appropriate IFM tensor and an appropriate kernel tensor from SRAM. Each request generator may be responsible for generating an SRAM request for a given IFM/kernel stream. The IFM fetcher unit 140*a* may mediate between four row request generators. The kernel fetcher unit 140*b* may mediate between four column request generators. Each row and column may be serviced once every 4 cycles in a round-robin manner.

Each row request may obtain an SRAM reading of 16 pixels. Each column request may obtain an SRAM reading of 4×16 pixels. The IFM fetcher unit 140*a* and the kernel fetcher unit 140*b* may include dispatcher buffers respectively dedicated to IFM streams and kernel streams. SRAM responses may be stored in corresponding buffers. Each row response dispatcher may divide 16 IFM pixels received from the SRAM into 4 vectors of 4 pixels each and transmit the 4 vectors as 4 consecutive cycles (e.g., $i_{0,0}$ to $i_{0,3}$ in FIG. 8B). Each column response dispatcher may divide 4×16 pixels received from the SRAM into 4×4 vectors of 4 pixels each and transmit the 4×4 vectors to the systolic array 140*c* as 4 consecutive cycles (e.g., $<k_{0,0}, k_{1,0}, k_{2,0}, k_{3,0}>$ to $<k_{0,3}, k_{0,3}, k_{1,3}, k_{2,3}, k_{3,3}>$ of FIG. 8B).

Figure 9:
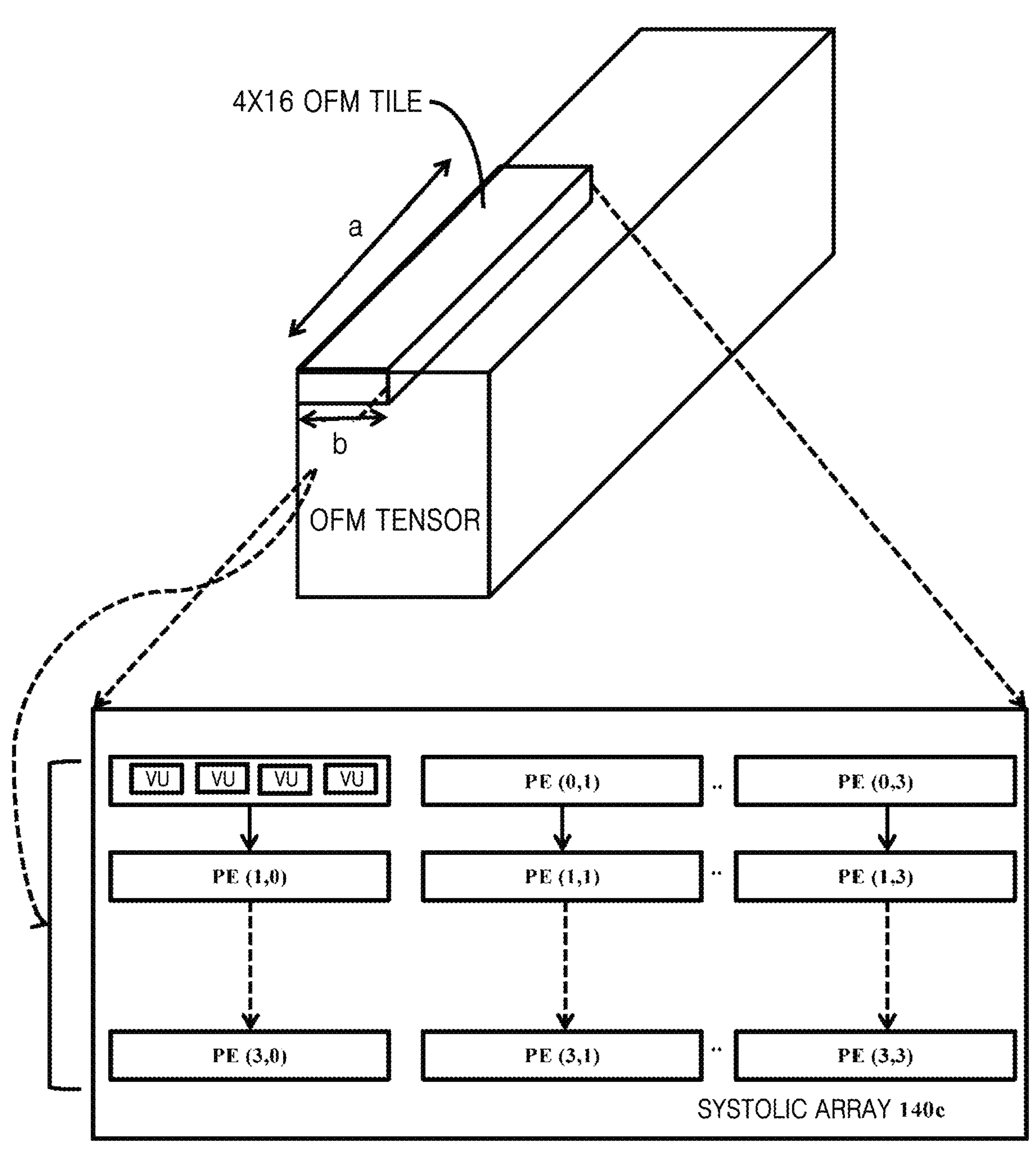
FIG. 9 is a diagram for describing traversal of an OFM tensor in a CONV operation according to one or more embodiments.

FIG. 9 is a diagram for describing traversal of an OFM tensor in a CONV operation according to one or more embodiments.

CONV, GEMM, and GEMV operation data path engines (e.g., the CONV operation data path engine 140 of FIG. 3) may autonomously generate OFM tensor tiles. A direction a of FIG. 9 is a channel direction, and pixels in the channel direction may be generated by different columns of the systolic array 140*c*. A direction b is the x-y plane direction, and pixels in the x-y plane may be generated by different rows of the systolic array 140*c*.

The OFM tile of FIG. 9 may be an OFM macro-tile. In the case of a CONV operation, the OFM tile may be a 3D tile. In the case of a GEMV operation, the OFM tile may be a 1D tile. In the case of a GEMM operation, the OFM tile may be a 2D tile. Referring to FIG. 9, in the case of a CONV operation and a GEMM operation, a macro-tile may be divided into 2D sets of pixels. The size of small OFM tiles may be determined according to the number of vector units in the systolic array 140*c*. In the case of a GEMV operation, the OFM tile may be a 1D tile. The order of traversing a macro-tile may be the same as the following loop structure.

for ofm_ch=0 to C, stride=16//Loop level-1-traversing OFM Channels for ofm_px=0 to H×W, stride=4//Loop level-0 traversing OFM pixels systolic_execution ( )//generation of 16×4 OFM tile A loop 0 may be an inner loop, and a loop 1 may be an outer loop. In the case of a GEMV operation, the loop 0 may be repeated only once. In the systolic array 140*c* having 4 rows and 4 columns (including 4 vector units VUs per PE), the dimension of a collection of pixels generated simultaneously may be 1×4×16.

Figure 10:
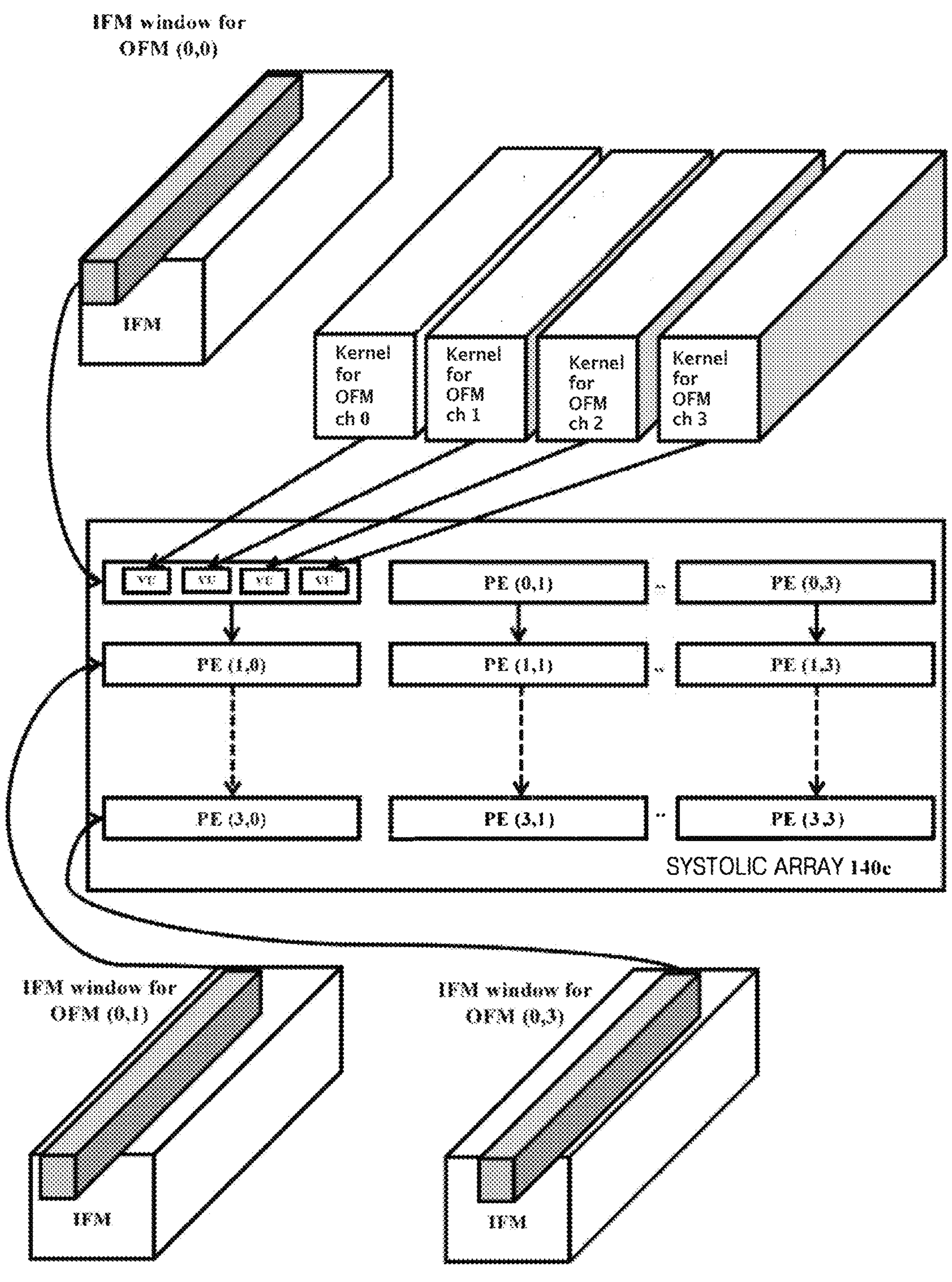
FIG. 10 is a diagram showing IFM windows and kernel tensors fed to different rows and columns of a systolic array according to one or more embodiments.

FIG. 10 is a diagram showing IFM windows and kernel tensors fed to different rows and columns of a systolic array according to one or more embodiments.

Each PE may manage 4 vector units having the same x and y positions and capable of generating 4 OFM pixels from 4 consecutive channels. Referring to FIG. 10, 1×4×16 OFM tiles may be distributed to 4×4 PEs. Each PE may generate 1×1×4 OFM tiles. Each row of PEs may receive an IFM window corresponding to a particular OFM(x,y) position. The start position of an IFM window may be calculated based on an OFM(x,y) position and a CONV operation stride. Each PE may include 4 vector units. Each vector unit may receive a kernel stream corresponding to an appropriate OFM channel. Each row may include 4 PEs. Four PEs may together form 16 vector units that generate OFM pixels from 16 consecutive channels.

Figure 11:
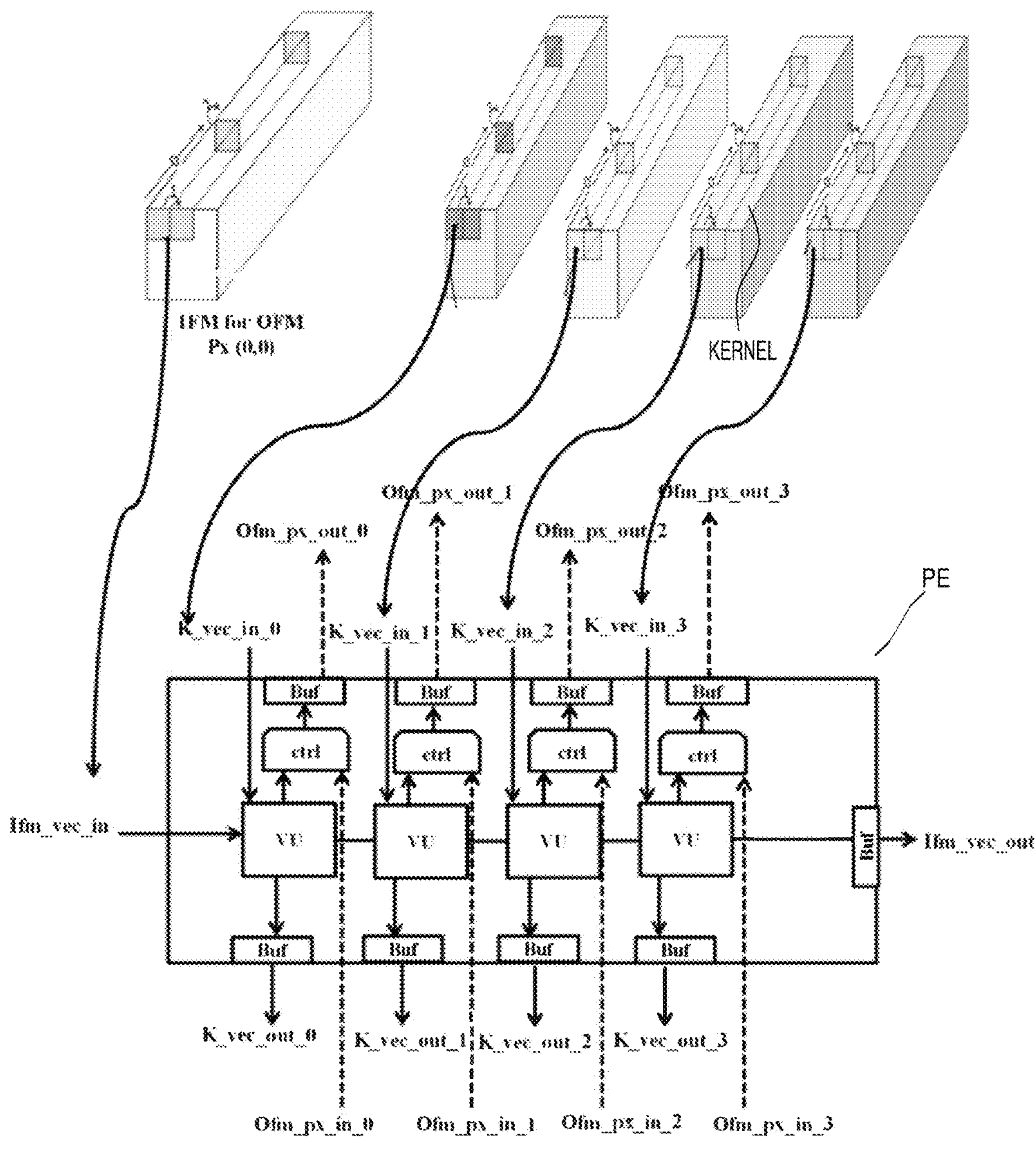
FIG. 11 is a diagram for describing formation of a 1D IFM vector and a kernel vector from each 3D tensor according to one or more embodiments.

FIG. 11 is a diagram for describing formation of a 1D IFM vector and a kernel vector from each 3D tensor according to one or more embodiments.

Each vector unit may generate one OFM pixel from a 1×4×16 OFM tensor and consume a 3D tensor of an IFM or kernel data. Also, data may be stored in a memory in a channel-major order, and the data may be transferred to a systolic array in the order shown in FIG. 11. FIG. 11 may show an order in which IFM and kernel tensor are passed for a given PE. The same kernel stream may be fed to all vector units in a row. The same IFM stream may be fed to all vector units in a row.

In one or more embodiments, when a 1D IFM is formed, an IFM window (or a kernel tensor) of 3×3×64 dimensions may be considered. The x-y dimension of an IFM window may be 3×3, and the number of channels (z direction) may be 64. IFM pixels and kernel pixels may be stored in a memory as a vector of a length of 16. In the tensor described above, there may be a total of 3×3×(64/16)=36 vectors. Therefore, each row request generator and column request generator may fetch 36 vectors by fetching one at a time from an IFM window or a kernel tensor and store them in a dispatcher buffer. 16 pixels from a designated dispatcher buffer may be injected to surrounding PEs by 4 pixels at a time. In the case of an IFM, peripheral PEs of each row may receive a vector of 4 pixels every cycle. In the case of a kernel, peripheral PEs of each column may receive 4 vectors of 4 pixels each cycle. In other words, 16 pixels may be injected from a 1×1×16 vector (4 pixels at a time), pixels may be moved to a next x-y position (another 1×1×16 vector to the end of the x-y plane), and pixels may be moved to a next channel vector. As the above process is repeated, vectors may be received. The process may be expressed as a loop structure below.

for (c2=0 to IFM_CH, c2=c2+SRAM_VEC_LEN)

for (x=0 to KERNEL_H)

for (y=0 to KERNEL_W)

for (c1=0 to SRAM_VEC_LEN, c1=c1+VU_VEC_LEN)

inject_vector[x, y, c2+c1:c2+c1+VU_VEC_LEN]//x, y position, channels c1+c2 to c1+c2+3

In other words, it may be 4 pixels in the channel direction, SRAM_VEC_LEN=length of SRAM response vector=16, VU_VEC_LEN=length of vectors processed by each VU=4, KERNEL_H=height of kernel=3, and KERNEL_W=width of kernel=3.

Figure 12:
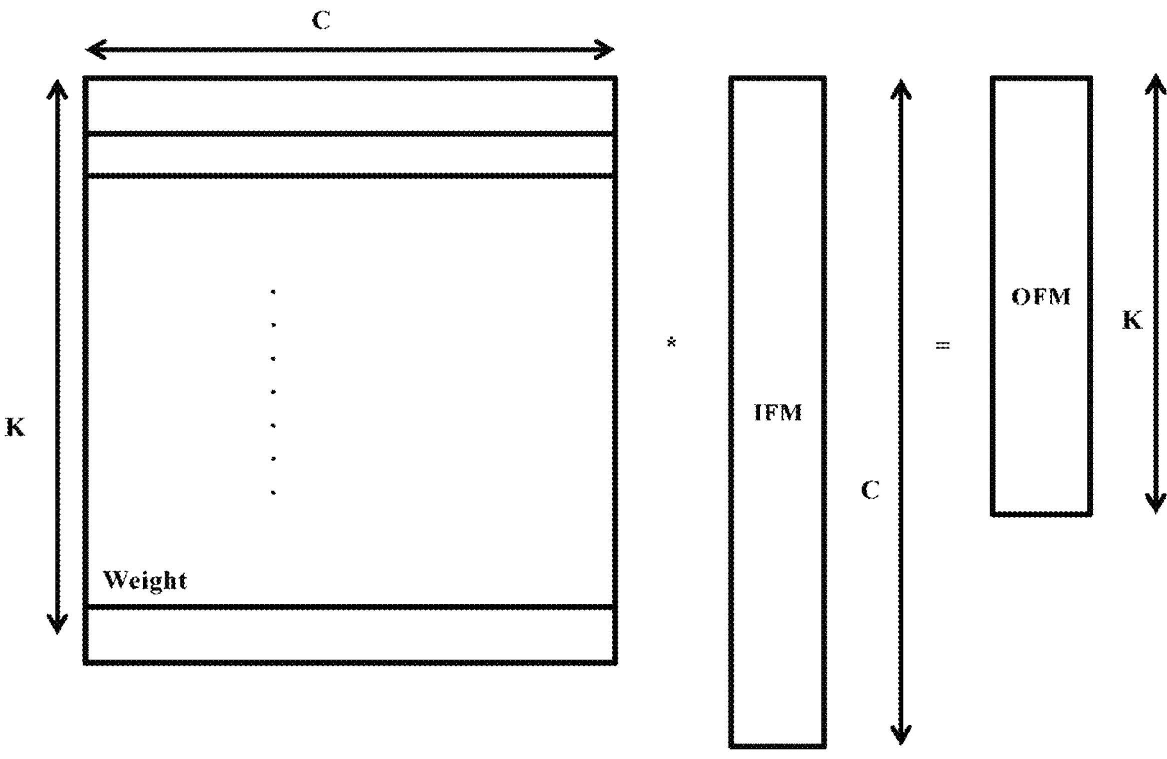
FIG. 12 is a diagram for describing a GEMV operation according to one or more embodiments.

FIG. 12 is a diagram for describing a GEMV operation according to one or more embodiments.

A GEMV operation and a CONV operation may be identical to each other. Referring to FIG. 12, the type of GEMV shown in FIG. 12 may appear in fully connected (FC) layers of CNN and LSTM layers. The GEMV operation may be treated as a CONV operation with an IFM tensor dimension of 1×1×C and a kernel tensor dimension of (1×1×C)×K. C may indicate the number of IFM channels, and K may indicate the number of OFM channels. A loop structure for the GEMV may be as follows.

for (k=1 to K)

for (c=1 to C)

ofm[k]+=ifm[c]*kernel[c][k]//K=Number of OFM channels; C=Number of IFM channels.

Figure 13:
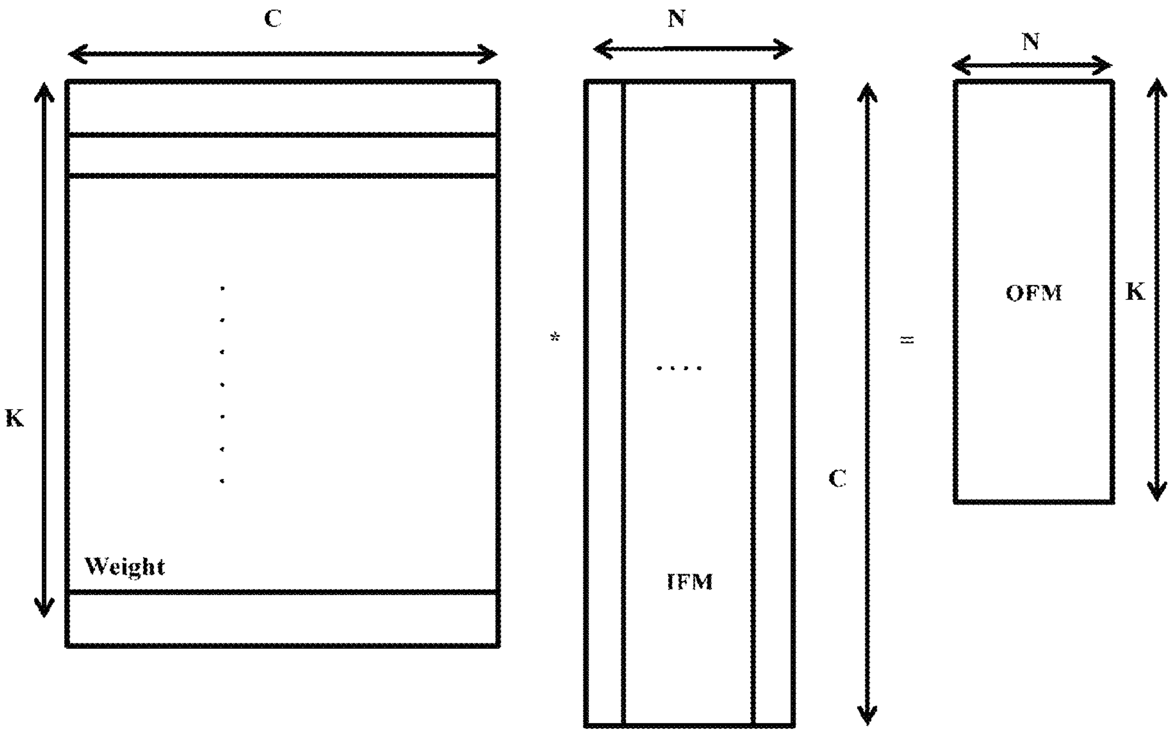
FIG. 13 is a diagram for describing a GEMM operation according to one or more embodiments.

FIG. 13 is a diagram for describing a GEMM operation according to one or more embodiments.

A GEMM may be considered as a plurality of GEMV operations. The GEMM operation may be in a FC layer and an LSTM layer in which batches of IFMs are processed. The GEMM operation may be treated as a CONV operation with an IFM tensor dimension of 1×1×C and a kernel tensor dimension of (1×1×C)×K. The size of an IFM batch may be N. Also, C may indicate the number of IFM channels, and K may indicate the number of OFM channels. A loop structure for the GEMM may be as follows.

for (n=1 to N)

for (k=1 to K)

for (c=1 to C)

ofm[n][k]+=ifm[n][c]*kernel[c][k]//K=Number of OFM channels; C=Number of IFM channels; N=IFM batch size.

An IFM, a kernel, and an OFM channel may be 1×1 dimensional.

A GEMV and a GEMM may be easily handled through a CONV operation of a particular tensor dimension. An IFM fetcher unit and a kernel fetcher unit may be configured to operate at different tensor dimensions.

Figure 14:
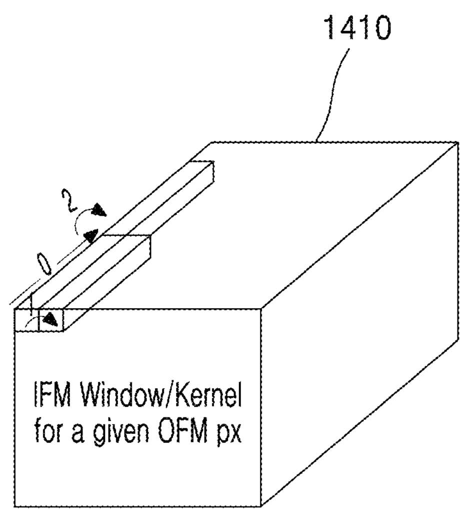
FIG. 14 is a diagram for describing a CONV operation according to one or more embodiments.
Figure 14:
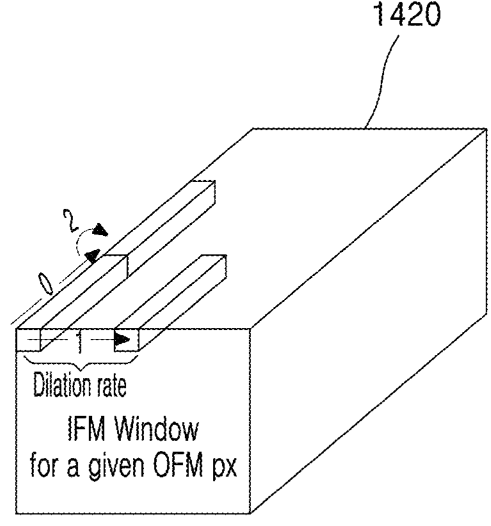

FIG. 14 is a diagram for describing a CONV operation according to one or more embodiments.

Referring to FIG. 14, the reference numeral 1410 of FIG. 14 may represent a regular CONV operation, and the reference numeral 1420 may represent an extended CONV operation.

Every row in a systolic array may consume a 3D window of an IFM tensor, and every column may consume a 3D kernel tensor. The reference numerals 0, 1, and 2 of FIG. 14 may represent an order in which each request generator (row or column depending on an IFM and a kernel) generates a global memory read request for IFM/kernel vectors stored in the channel-major order. A kernel and an IFM window may be traversed in the channel-major order. Energy efficiency may be increased, and an area may be reduced by traversing in the channel-major order.

While an extended CONV operation is being performed, instead of traversing successive IFM vectors, IFM vectors having appropriate x and y coordinates may be fetched. An interval between IFM vectors may be determined by a dilation rate. Therefore, an IFM fetcher unit designed for a general CONV operation may be modified to perform an extended CONV operation by adding one additional parameter, that is, an expansion rate. Necessary hardware changes are minimal and may be some additional multipliers for an address generation logic of an IFM fetcher unit.

Figure 15:
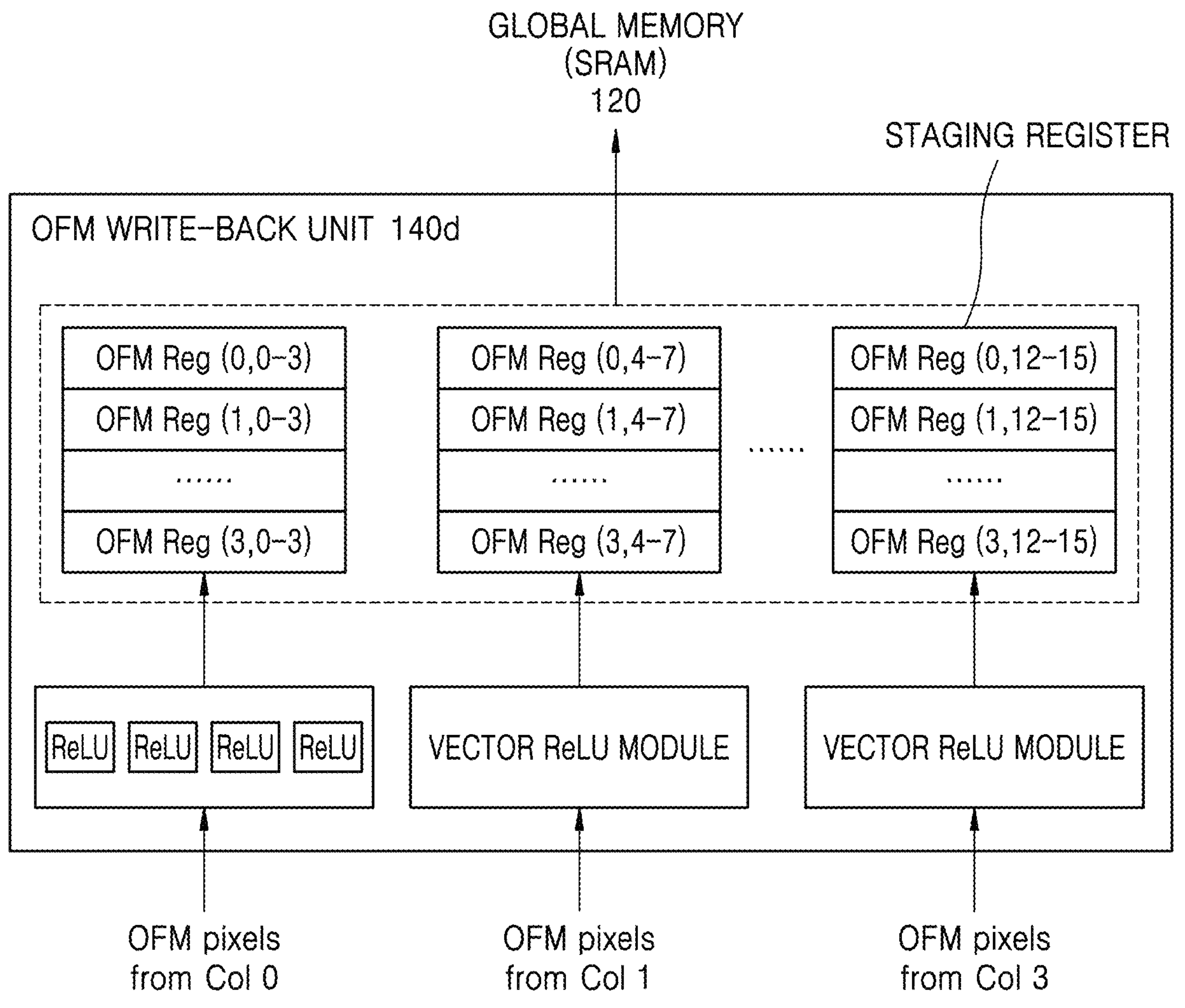
FIG. 15 is a block diagram for describing an OFM write-back unit according to one or more embodiments.

FIG. 15 is a block diagram for describing an OFM write-back unit according to one or more embodiments.

Referring to FIG. 15, the OFM write-back unit 140d may include an OFM staging register and a vector ReLU module.

When an OFM tile is calculated, OFM pixels may be written back to the global memory 120. Each row generates an OFM pixel of a given x, y coordinate, but OFM pixel may be generated in continuous channels. While OFM pixels are being written, the OFM pixels may be integrated into channel-major vectors and written again. This may occur in the OFM write-back unit 140*d*.

When the last IFM pixel and the last kernel pixel are transferred to a row and a column, the OFM write-back unit 140*d* may be activated. OFM pixels may be rippled upwards through columns of a systolic array and buffered in a collection of staging registers. For example, OFM pixels may be transferred from the systolic array to the OFM write-back unit 140*d*. The OFM write-back unit 140*d* may form channel-major vectors by integrating OFM pixels, which correspond to different columns but are in the same row, and re-write the channel-major vectors to the global memory 120. The vector ReLU module may apply an activation function to OFM pixels before the staging registers are filled. Each staging register may have 4 OFM pixels.

Figure 16:
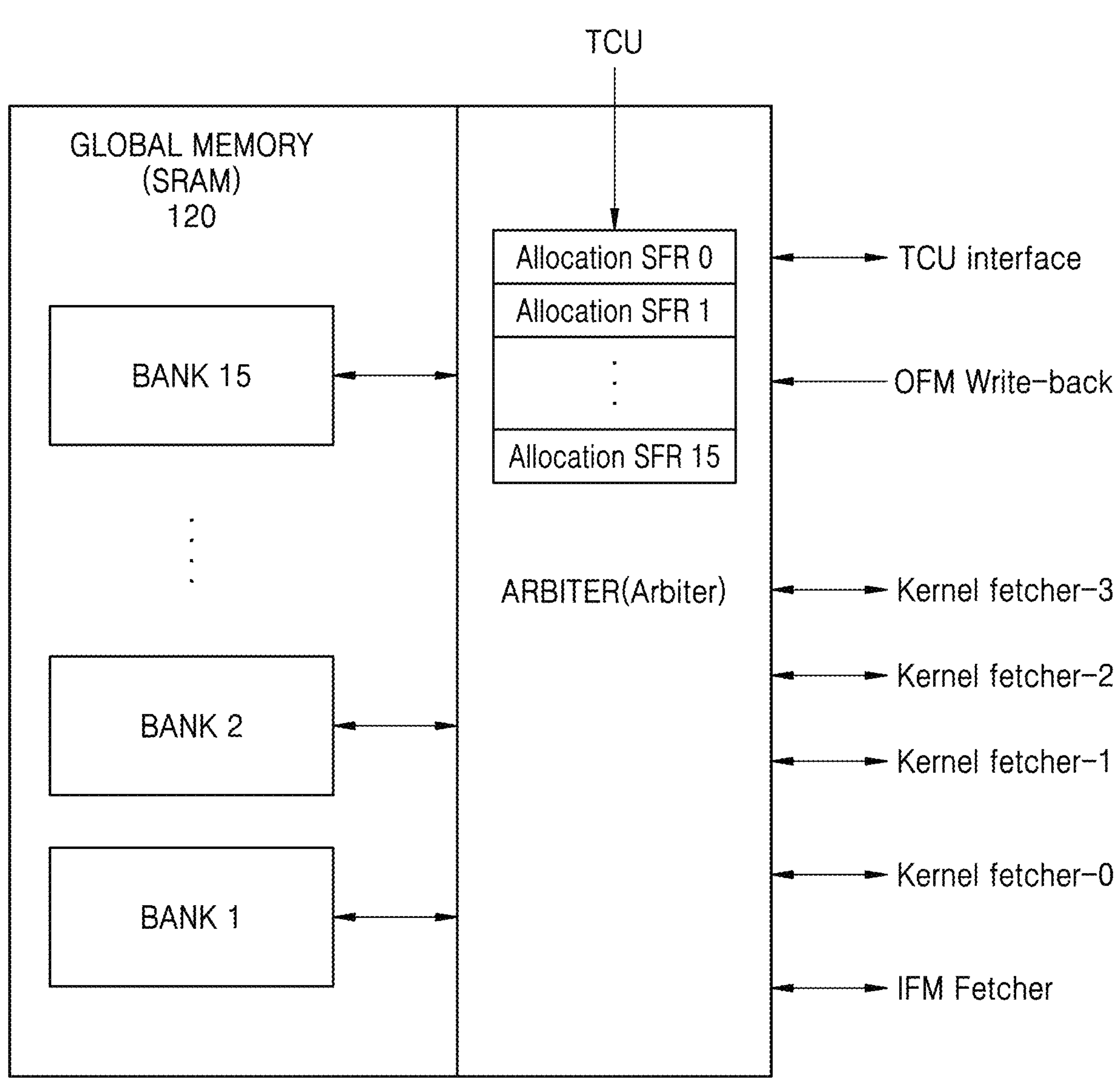
FIG. 16 is a block diagram for describing a global memory according to one or more embodiments.

FIG. 16 is a block diagram for describing a global memory according to one or more embodiments.

The global memory 120 may hold an IFM tensor and a kernel tensor. The global memory 120 may include multiple SRAM banks to be simultaneously accessed by various modules. Various modules that access SRAM banks may be an IFM fetcher interface, a kernel fetcher interface, an OFM write-back interface, a top-level control unit (TCU) interface, etc.

An IFM fetcher unit may fetch IFM vectors through the IFM fetcher interface.

A kernel fetcher unit may fetch kernel vectors through the kernel fetcher interface. The number of kernel vectors fetched in a given cycle may be equal to the number of vector units of each PE. For example, the kernel fetcher unit may generate a request for 4 kernel vectors every cycle. Therefore, there may be four kernel fetcher interfaces, and the kernel fetcher interfaces may access SRAM banks.

An OFM write-back unit may write OFM vectors to the global memory 120 through the OFM write-back interface.

A top-level controller may facilitate data transfer between the global memory 120 and off-chip DRAM through the TCU interface.

In one or more embodiments, the global memory 120 may be designed as a multi-bank high-bandwidth module that provides guaranteed access latency, and bank allocation may be controlled by software. This may enable a run-time to generate inexpensive logical buffers for different types of IFM tensors, kernel tensors, and the like.

To keep the memory utilization high, a unified address space may be used for all types of tensor data. To prevent bank collision, a static and flexible bank allocation scheme may be used in which each bank is assigned to a predetermined type of tensor when starting a systolic operation. Therefore, delays that may occur due to bank collisions may be eliminated. Also, a bank selection and arbitration logic may become very simple.

The apparatus 100, top-level controller 110, global memory 120, depth-wise and nonlinear engine 130, CONV operation data path engine 140, IFM fetcher unit 140*a*, kernel fetcher unit 140*b*, OFM write-back unit 140*d*, multiplier hardware 510, adder tree 520, accumulator 530, and PE in FIGS. 1-16 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term “processor” or “computer” may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-16 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD−Rs, CD+Rs, CD−RWs, CD+RWs, DVD-ROMs, DVD−Rs, DVD+Rs, DVD−RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus, the apparatus comprising:

a systolic array configured to receive an input feature map (IFM) vector stream from an IFM tensor and a kernel vector stream from a kernel tensor from a global memory, the systolic array being on-chip together with the global memory and comprising a plurality of processing elements (PEs), wherein each of the plurality of PEs comprises a plurality of vector circuitries, wherein each of the plurality of vector circuitries comprises a collection of multiplier hardware and an adder tree and each of the plurality of vector circuitries is configured to, per unit clock cycle, generate one output feature map (OFM) pixel by performing a complete dot-product operation on an IFM vector of the IFM vector stream and a kernel vector of the kernel vector stream, each PE generates at least two OFM pixels per unit clock cycle by simultaneously performing a plurality of complete dot-product operations so that throughput in parallel processing capability of the systolic array is enabled, wherein a first PE of the plurality of PEs, per unit clock cycle, generates a plurality of OFM pixels by performing at least two complete dot-product operations using the plurality of vector circuitries of the first PE, wherein the plurality of PEs in a same row share a same IFM vector stream and the plurality of PEs in a same column share a same kernel vector stream.

2. The apparatus of claim 1, wherein the global memory is connected to an IFM fetcher circuitry, and the IFM fetcher circuitry is configured to fetch IFM vectors from the global memory and form the IFM vector stream fed to the systolic array.

3. The apparatus of claim 2, wherein the IFM fetcher circuitry comprises buffers respectively dedicated to IFM vector streams, and the buffers are configured to store the IFM vector streams fed to the systolic array.

4. The apparatus of claim 1, wherein the global memory is connected to a kernel fetcher circuitry, and the kernel fetcher circuitry is configured to fetch kernel vectors from the global memory and form the kernel vector stream fed to the systolic array.

5. The apparatus of claim 4, wherein a number of kernel vectors fetched by the kernel fetcher circuitry is equal to a number of vector circuitries available in each of the PEs.

6. The apparatus of claim 4, wherein the kernel fetcher unit comprises buffers respectively dedicated to kernel vector streams, and the buffers are configured to store the kernel vector streams fed to the systolic array.

7. The apparatus of claim 1, wherein the IFM vector stream and the kernel vector stream are input to the systolic array, based on identification of an IFM window and the kernel tensor; and streaming pixels of the IFM window and the kernel tensor into the systolic array, such that relative positions of IFM vectors and kernel vectors input to at least one of the plurality of PEs match.

8. The apparatus of claim 1, further comprising an OFM write-back circuitry configured to collect OFM pixels generated from the systolic array and writing the OFM pixels to the global memory.

9. The apparatus of claim 1, wherein the plurality of PEs is arranged in an m×n matrix form, wherein m denotes a number of rows, n denotes a number of columns, and m and n are equal.

10. The apparatus of claim 9, wherein at least one PE from the plurality of PEs in each row receives IFM vectors and transfers the IFM vectors to PEs next to the at least one PE in the same row as the at least one PE.

11. The apparatus of claim 9, wherein at least one PE from the plurality of PEs in each column receives kernel vectors and transfers the kernel vectors to PEs below the at least one PE in a direction in which kernel vectors are transferred in the same column as the at least one PE.

12. The apparatus of claim 1, wherein the plurality of vector circuitries within each PE is configured to perform the dot-product operations in parallel based on lengths of respective dot-products.

13. The apparatus of claim 1, wherein the global memory comprises a plurality of memory banks, and each of the plurality of memory banks is assigned to a tensor of a predetermined type at a beginning of a systolic operation.

14. The apparatus of claim 1, wherein the apparatus is configured to accelerate machine learning operations.

15. The apparatus of claim 1, wherein the apparatus is a smartphone, a laptop, a desktop, a smart watch, or a smart TV.

16. The apparatus of claim 1, wherein the IFM vector stream comprises at least two IFM vectors and the kernel vector stream comprises at least two kernel vectors, wherein the first PE receives at least two IFM vectors and at least two kernel vectors per unit clock cycle, and wherein the plurality of vector circuitries within each PE enables the increased throughput in parallel processing capabilities of the systolic array.

17. An apparatus, the apparatus comprising:

a convolution operation data path circuitry, connected to a global memory storing input feature map (IFM) data, weights, kernel data, and output feature map (OFM) data, comprising:

an IFM fetcher circuitry, connected to the global memory, configured to form an IFM vector stream comprising at least two IFM vectors from the IFM data;

a kernel fetcher circuitry, connected to the global memory, configured to form a kernel vector stream comprising at least two kernel vectors from the kernel data;

a systolic array comprising a plurality of processing elements (PEs) and is configured to receive the IFM vector stream and the kernel vector stream; and an OFM write-back circuitry configured to write a plurality of OFMs to the global memory, wherein each of the plurality of PEs comprises a plurality of vector circuitries, wherein each of the plurality of vector circuitries comprises a collection of multiplier hardware and an adder tree and each of the plurality of the vector circuitries is configured to, per unit clock cycle, perform a complete dot-product operation on an IFM vector of the IFM vector stream and a kernel vector of the kernel vector stream, each PE generates at least two OFM pixels per unit clock cycle by simultaneously performing a plurality of complete dot-product operations is that throughput in parallel processing capability of the systolic array is enabled, and wherein a number of the OPM pixels generated per unit clock cycle of each PE is dependent on a number of vector circuitries available in each PE.

18. The apparatus of claim 17, wherein the kernel fetcher circuitry is further configured to fetch kernel vectors from the global memory and form the kernel vector stream.

19. The apparatus of claim 18, wherein a number of the kernel vectors is equal to a number of vector circuitries available in each of the PEs.

20. The apparatus of claim 18, wherein the kernel fetcher circuitry comprises buffers respectively dedicated to kernel vector streams, and the buffers are configured to store the kernel vector streams fed to the systolic array.

* * * * *